United States Patent
Pearl

(10) Patent No.: US 6,797,077 B2
(45) Date of Patent: Sep. 28, 2004

(54) LATEX PAINT REMOVER

(75) Inventor: Richard E. Pearl, Hinckley, OH (US)

(73) Assignee: Pentagonal Holdings, Inc., Pepper Pike, OH (US)

( * ) Notice: Subject to any disclaimer, the term of this patent is extended or adjusted under 35 U.S.C. 154(b) by 234 days.

(21) Appl. No.: 09/812,605

(22) Filed: Mar. 20, 2001

(65) Prior Publication Data

US 2002/0016274 A1 Feb. 7, 2002

Related U.S. Application Data

(62) Division of application No. 09/603,059, filed on Jun. 26, 2000, now Pat. No. 6,235,694.

(51) Int. Cl.$^7$ .............................................. C11D 17/00
(52) U.S. Cl. ........................ 134/34; 510/137; 510/189; 510/365
(58) Field of Search ................................ 510/137, 189, 510/365, 407, 201, 505, 174, 202, 417; 134/34, 40, 38; 252/364

(56) References Cited

U.S. PATENT DOCUMENTS

| | | |
|---|---|---|
| 1,812,321 A | 6/1931 | Davidson |
| 1,829,583 A | 10/1931 | Davidson et al. |
| 2,897,104 A | 7/1959 | Duncan |
| 3,933,674 A | 1/1976 | Farnsworth |
| 4,336,072 A | 6/1982 | Moore et al. |
| 4,533,487 A | 8/1985 | Jones |
| 4,753,548 A | 6/1988 | Forrer |
| 4,818,250 A | 4/1989 | Whitworth |
| 4,968,447 A * | 11/1990 | Dixon et al. ................. 510/202 |
| 4,973,420 A | 11/1990 | Van De Mark |
| 5,146,938 A | 9/1992 | Lutener et al. |
| 5,215,675 A * | 6/1993 | Wilkins et al. ............. 510/206 |
| 5,333,967 A | 8/1994 | Foley et al. |
| 5,338,368 A | 8/1994 | Fletcher et al. |
| 5,413,729 A * | 5/1995 | Gaul .......................... 510/206 |
| 5,449,474 A | 9/1995 | Lucas et al. |
| 5,536,439 A * | 7/1996 | Harbin ....................... 510/212 |
| 5,665,690 A | 9/1997 | Lucas et al. |
| 5,691,290 A * | 11/1997 | Vonk et al. ................. 510/212 |
| 5,780,415 A | 7/1998 | Leonard et al. |
| 5,783,551 A | 7/1998 | Mirsky |
| 5,788,781 A | 8/1998 | Van Slyke |
| 5,811,380 A | 9/1998 | Weitz |
| 5,993,562 A * | 11/1999 | Roelofs et al. ................ 134/7 |
| 6,235,694 B1 * | 5/2001 | Pearl .......................... 510/201 |
| 6,280,519 B1 * | 8/2001 | Yezrielev et al. ........... 106/311 |

FOREIGN PATENT DOCUMENTS

RU          1460067       2/1989

OTHER PUBLICATIONS

Preliminary Report to California Air Resources Board, Contract No. 95–308, "Updated Maximum Incremental Reactivity Scale for Regulatory Applications," William P. L. Carter, Aug. 6, 1998.

* cited by examiner

*Primary Examiner*—Gregory Webb
(74) *Attorney, Agent, or Firm*—Calfee, Halter & Griswold, LLP

(57) ABSTRACT

Isobutyl isobutyrate is a safe, effective, and environmentally-friendly cleaning composition for removing dried latex paint.

35 Claims, No Drawings

LATEX PAINT REMOVER

RELATED APPLICATION

This case is a division of application Ser. No. 09/603,059, filed Jun. 26, 2000, now U.S. Pat. No. 6,235,694.

FIELD OF THE INVENTION

The present invention relates to organic cleaning compositions useful for removing dried latex paint and other lipophilic materials such as soils and adhesives.

BACKGROUND OF THE INVENTION

A common test for determining whether a dried sample of paint is oil-based or latex-based is to contact the sample with xylene. If the paint sample is latex-based, the sample will dissolve for easy removal. If the sample is oil-based, the sample will remain intact.

Because of this selective solvency, xylene has been used as a commercial latex-based paint remover, alone or together with other components. However, because it is an aromatic compound, xylene also poses a significant health and environmental risk.

Accordingly, it is desirable to provide a new latex paint remover which mimics xylene in terms of its selective removal of latex-based paints but which is more benign from a health and environmental standpoint.

SUMMARY OF THE INVENTION

This and other objects are accomplished by the present invention which is based on the discovery that isobutyl isobutyrate not only mimics xylene in terms of its selective removal of latex-based paints but is also more benign than xylene from a health and environmental standpoint.

Therefore, the present invention provides a new process for removing dried latex paint and other organic contaminants from a surface comprising contacting the contaminant with a cleaning composition composed of isobutyl isobutyrate. In addition, the present invention also provides new compositions for removing dried latex paints and other organic contaminants comprising 10 to 99% isobutyl isobutyrate, the composition preferably being essentially free of aromatic compounds and alkali metal hydroxides.

DETAILED DESCRIPTION

In accordance with the present invention, dried latex paints and other organic contaminants are removed from surfaces by contacting the surface with isobutyl isobutyrate.

Surface Contaminants

The present invention is directed primarily to removing dried latex paints.

Latex paints are typically composed of polymer particles and pigments emulsified in water. When applied to a surface, the water carrier evaporates and the polymer particles coalesce to form a coherent, pigment-containing film. Most latex paints are formulated with acrylic polymers (polymers and copolymers of acrylic acid, acrylic esters and acrylonitrile) which may include ionic cross-linkers to enhance bonding of individual polymer particles in the coalesced film.

In a typical oil-based paint, however, the film-forming specie is composed of a natural and/or synthetic polymer dissolved in a suitable organic solvent such as mineral spirits, turpentine or the like. When applied to a surface, the organic solvent evaporates and the polymer deposits on the surface as a film. Further polymerization and/or ethylenic cross-linking (curing) often occurs to make the film coherent.

Because of these differences in film-forming mechanisms, oil-based paints once dried and cured are usually stronger and tougher than their latex-based counterparts. Accordingly, latex paints are easier to remove than oil-based paints, which explains why xylene and analogous materials can effectively remove latex-based paints but not oil-based paints.

In any event, the present invention is directed primarily to removing dried latex-based paints in that the inventive compositions, like xylene, will effectively dissolve latex-based paints once dried but will leave cured oil based paints largely intact.

In addition to removing dried latex-based paints, however, the inventive compositions can also be used to remove a wide variety of other lipophilic materials. For example, the inventive compositions will remove oil-based paints prior to substantial cure. In addition, the inventive compositions will remove adhesives, inks, chewing gum, tars, greases, glues, animal fats, vegetable oils, tree sap and other lipophilic soils.

Isobutyl Isobutyrate

Isobutyl isobutyrate or "IBIB" has a unique combination of properties making it ideally suited for use in removing dried latex-based paint and other lipophilic contaminants. For example, IBIB has a solvency approximately the same as that of xylene allowing it to function like xylene in terms of removing dried latex based paints, solvating other lipophilic contaminants but leaving solvent-based paints once cured largely intact. Unlike xylene, however, IBIB has numerous other properties making it far safer and more environmentally-friendly than xylene when used in a typical home or commercial setting.

For example, IBIB has a flash point of 104° F. and therefore is considered a combustible, as opposed to a flammable, as is xylene which has a flash point of about 80° F. In addition, IBIB is essentially benign in terms of its toxicology and its propensity to cause skin irritation and eye irritation. In this connection, IBIB is considered to be non-toxic (i.e. not requiring labeling as a toxic) when tested in accordance with the protocol of the Federal Hazardous Substance Act, 16 CFR 1500.3(c)(2)(i). In addition, IBIB is not considered to be a primary skin irritant when tested according to the protocol of 16 CFR 1500.41 and 1500.3(c)(4). Similarly, IBIB is not considered to be a primary eye irritant when tested according to the protocol of 16 CFR 1500.42 and 16 CFR 1500.3(c)(4). In addition, IBIB has an MIR value of 0.86 meaning that it is considered to have a low ozone-creating potential as opposed to xylene with an MIR of approximately 7.8.

In this connection, the California Air Resources Board or "CARB", which is part of the California Environmental Protection Agency, has ranked all commonly available volatile organic compounds and solvents in terms of their potential for producing tropospheric ozone when released into the atmosphere. Since tropospheric ozone is a precursor to urban smog, a solvent's MIR or "Maximum Incremental Reactivity" is a good indicator of its potential to produce smog. IBIB's comparatively low MIR of 0.86 indicates that it has low potential as a smog former and therefore is environmentally-friendly as well as relatively benign from a health standpoint. Xylene, on the other hand, has an MIR of approximately 7.8, depending on the isomeric mixture in the composition.

Isobutyl Isobutyrate Analogs

In addition to or in lieu of IBIB, other analogous compounds can be used to provide solvency characteristics in accordance with the present invention. For example other esters having eight carbon atoms, such as propyl heptanoate and heptyl propionate, can be used, and other esters with seven or nine carbon atoms can also be used.

Esters with six carbon atoms are easily made. However, they have low flash points and low boiling points and are therefore difficult to ship and dangerous to handle. Preferably, therefore they are avoided, although they can be tolerated in amounts up to 75 wt. %, preferably 50 wt. %, in the cleaning compositions of the present invention without undue adverse effect. Esters with ten carbon atoms, on the other hand, are more difficult to make, unduly oily and of unpredictable purity. Accordingly, they are also preferably avoided, although like the $C_6$ esters, they can also be tolerated in amounts up to 75 wt. %, preferably 50 wt. %, without undue adverse effect.

Mixtures of esters containing at least three of hexyl, heptyl, octyl, nonyl and decyl acetates, such as the line of mixed esters sold by Exxon Chemical Company under the designation Exxon Exxates, can also be used.

Esters with less than six carbon atoms are too volatile, while esters with more than 10 carbon are too oily, to totally replace IBIB. However, such esters can also be used for partial replacement of up to 50 wt. % of the IBIB in the cleaning compositions of the present invention without undue adverse effect.

Propylene carbonate, a four-carbon ring-structured ester, also can be used as a partial or total replacement for IBIB as it also has a desirable combination of flash point (132° F.), boiling point (242° F.) and solvency.

Other naturally occurring esters having flash points greater than 60° F., preferably greater than 100° F., and boiling points of greater than 120° F. can also be used in lieu of, or as a partial replacement for, the IBIB in the cleaning compositions of the present invention.

Preferably, IBIB is present in the cleaning compositions of the present invention in an amount of at least 25 wt. %, more preferably at least 50 wt. %, even more preferably at least 75 wt. %, although cleaning compositions with as little as 10 wt. % IBIB are effective for some purposes.

Liquid Carriers

In accordance with the present invention, dried latex paint or other contaminant can be removed from a surface by contact with neat IBIB or analog, i.e. a composition composed essentially completely of IBIB or analog. However, it is also possible to include in the cleaning composition a suitable liquid carrier.

Essentially any material which does not adversely react with IBIB or analog, which does not adversely react with the surface being cleaned, which dissolves the IBIB or analog and which is liquid at room temperature can be used for this purpose. Examples include aromatic and aliphatic (both saturated and unsaturated) hydrocarbon solvents, oxygenated organic solvents, other polar organic compounds and naturally-occurring solvents. Specific examples include mineral spirits, various petroleum fractions such as gasoline, kerosene, jet fuel and the like, esters, organic acids, anhydrides, alcohols, glycols, polyols, glycol ethers, furans, amines, amides, nitriles, turpentine, essential oils, terpenes and the like. Preferred materials are the $C_5$ to $C_{20}$ paraffins, $C_2$ to $C_{16}$ alcohols, $C_3$ to $C_{12}$ glycols, $C_3$ to $C_{12}$ polyols, $C_6$ to $C_{16}$ glycol ethers, d-limonene and β-pinene. Especially suitable solvents are the $C_9$ to $C_{16}$ normal and iso-paraffins, especially the $C_{10}$ and $C_{11}$ normal paraffins and the $C_9$ to $C_{12}$ iso-paraffins, $C_6$ to $C_{12}$ glycol ethers and d-limonene.

Although any organic solvent meeting the above criteria can be used in accordance with the present invention, it is desirable to choose specific liquid carriers which minimize adverse health and environmental impacts. Accordingly, it is preferred that the liquid carrier be non-toxic according to 16 CFR 1500.3(c)(2)(i), discussed above, and have a Primary Irritation Score of 5.00 or less, more preferably 1.5 or less, or even 0.50 or less, and most desirably 0.09 or less, when tested by the protocol 16 CFR 1500.3(c)(4). In addition, it is also preferable that the liquid carrier is not an eye irritant under 16 CFR 1500.42. Similarly, it is also preferred that the liquid carrier have an MIR of 2.0 or less, preferably 1.5 or less, or even 1.0 or less.

It is also desirable that the liquid carrier, like IBIB, have a flash point of above 100° F. for safety purposes.

The amount of liquid carrier that can be incorporated into a cleaning composition according to the present invention can vary widely, and essentially any amount can be used. For example, the inventive compositions can contains as little as 10 wt. % IBIB or analog with the balance being the liquid carrier and the other components discussed below. More typically, the compositions will contain 30, 50, 66, 80 or even 90 wt. % IBIB or analog. Compositions containing 98 or even 99 wt. % IBIB or analog can also be used, as can compositions containing 100 wt. % IBIB or analog, as mentioned above.

Surfactants and Other Ingredients

In addition to liquid carriers, the compositions used in the inventive process can also include other ingredients such as colorants, antioxidants, fragrances, emollients, thickeners and defoamers. In addition, they may also contain surfactants, if desired.

In this connection, it is contemplated that the inventive compositions will be used at least in some instances for removing polar soils and other contaminants containing moisture. In other instances, the surfaces to be cleaned may come into contact with water, before, during of after treatment. In these situations, the inventive compositions may include suitable surfactants to aid mixing and emulsification of the organic and aqueous constituents which may be encountered in the system.

Any type of surfactant can be used for this purpose including amphoteric, anionic, cationic and non-ionic varieties. Examples of suitable amphoteric surfactants include acyl/dialkyl ethylenediamines and derivatives, n-alkyl amino acids and the like. Examples of suitable anionic surfactants include sodium lauryl sulfonate, sodium dodecyl sulfate, acylglutamates, acylpeptides, sarconsinates, taurates and the like; carboxylic acids and salts such as alkanoic acids, ester carboxylic acids, ether carboxylic acids and the like; phosphoric acid esters and salts; and the like; sulfonic acids and salts, such as acyl isethionates, alkylaryl sulfonates, alkyl sulfonates, sulfosuccinates and the like; sulfuric acid esters, such as alkyl ether sulfates, alkyl sulfates and the like. Examples of suitable cationic surfactants include alkyamines, alkyl imidazolines, ethoxylated amines, quaternaries, such as alkylbenzyldimethylammonium salts, alkyl betains, heterocyclic ammonium salts, tetraalkylammonium salts and the like. Examples of suitable nonionic surfactants include alcohols; alkanolamide such as alkanolamine-derived amides and the like; ethoxylated amides and the like; amine oxides; esters such as ethoxylated carboxylic acids, ethoxylated glycerides, glycol esters (and derivatives), monoglycerides, polyglyceryl esters, polyhydric alcohol esters and ethers, sorbitan/soribtol esters, triesters of phosphoric acid and the like; ethers such as ethoxylated alcohols, including fatty alcohol ethoxylate, polyoxyethylene nonylphenol, ethoxyated lanolin, ethoxylated polysiloxanes, propoxylated PEO ethers, alkylpolyglycosides and the like. Non-ionic surfactants are desirable, as reactions with IBIB or analog will be avoided. The amount of surfactant to include in a particular composition made in accordance with this aspect of the present invention can also vary widely, with as much as 40 wt. % or more being possible, but about 0.1 to 25 wt. % or even 0.5 to 5 wt. % being more typical. In general, any amount of surfactant can be used, it being desirable that enough surfactant is present to effect stable mixing of any water or moisture that might be encountered while not so much that the composition becomes prohibitively expensive to use.

Water

In still another embodiment of the invention, water can be included in the inventive composition to provide an aqueous cleaning system. In this embodiment, it is desirable that the composition also contain sufficient surfactant to keep the IBIB or analog and any other organic ingredients that might be present emulsified in the system so that the composition as a whole is stable. The same anionic, cationic and non-ionic surfactants described above can be used for this purpose as well, and the emulsified system so obtained can be either an oil-in-water or a water-in-oil emulsion, depending on the particular emulsifier package used.

The amount of water to be included in this embodiment of the invention can vary widely and essentially any amount can be used. Typically, water will be present in amounts of 5 to 80, preferably 20 to 50 wt. %, although as much as 90 wt. % is possible. Also, the compositions of this embodiment may also contain the organic liquid carriers described above, in the proportions described above relative to the IBIB or analog present, and the other ingredients also noted above.

Health and Environmental Properties

As indicated above, it is desirable that the cleaning compositions used in accordance with the present invention be safer and more environmentally-friendly than xylene and other materials conventionally used for removing latex-based paint and similar contaminants.

In this connection, U.S. Pat. No. 5,536,439 to Harbin discloses cleaning compositions composed of an alkali metal hydroxide dissolved in a glycol ether together with a variety of different organic solvents, one of which may be IBIB. Because alkali metal hydroxides are corrosive, the compositions used in the present invention preferably are essentially free of these materials. Preferably, they are also essentially free of aromatic compounds as well. In another embodiment, they are free of glycol ethers and preferably aromatic compounds and alkali metal hydroxides as well.

In addition, the compositions of the present invention are also desirably formulated so that they achieve the same beneficial health and environmental properties described above in connection with the organic liquid carriers. That is to say, even though the compositions of the present invention may include additional ingredients over and above IBIB or its analog and the liquid carrier, it is still desirable that the compositions as a whole are non-toxic according to 16 CFR 1500.3(c)(2)(i) and, in addition, have a Primary (Dermal) Irritation Score of 5.00 or less, more preferably 1.5 or less (See p. 5, 1.19), or even 0.50 or less, and most desirably 0.09 or less (See p. 5, 1. 19), when tested by the skin irritation protocol of 16 CFR 1500.41 and 16 CFR 1500.3(c)(4). Similarly, it is also preferable that the composition as a whole is not classified an eye irritant by 16 CFR 1500.42 and has an MIR of 2.0 or less, preferably 1.5 or less, or even 1.0 or less.

Removal Process

In order to carry out the inventive cleaning process, the dried latex paint or other contaminant to be removed is contacted with the cleaning composition of the present invention in a conventional manner. As a result, the contaminant is dissolved sufficiently so that the contaminant can be removed from the surface being cleaned.

Depending on the nature of the contaminant and the amount of cleaning composition used, the contaminant may be removed by the flow and/or evaporation of the cleaning composition itself. In other instances, it may by necessary to physically remove the contaminant such as by wiping the surface with a cloth or other device or by washing with another liquid such as soapy water or an organic solvent.

Regardless of which technique is used, however, the cleaning compositions of the present invention will effectively remove dried latex-based paints and other contaminants from a variety of different surfaces in a manner similar to xylene yet in a much safer and more environmentally-friendly way.

EXAMPLES

Example 1

In order to more thoroughly describe the present invention, cleaning compositions based on IBIB were tested for their ability to remove dried latex paint. Test specimens were prepared by coating black tiles with a single layer of white latex paint and allowing the paint to dry overnight. Each test specimen was then loaded in the tray of a Gardner Straight-Line Washability Apparatus and scrubbed for 10 cycles with a wood block wrapped in cheese cloth, the cheese cloth being impregnated with 10 ml of the cleaning composition to be tested. Reflectance measurements of the test specimens were taken before painting, after painting and after cleaning, and the percent paint removal calculated from the data obtained.

Three different compositions of the present invention were tested, one containing 100% IBIB, the other two containing 90 wt. % IBIB and 50 wt. % IBIB, respectively, with the balance being odorless mineral spirits. A comparative composition containing 73.4% xylene isomers, 20.9% ethylbenzene, 3.3% diethylene glycol methyl ether, 2.2% alkyl benzenes, and 0.2% toluene was also tested.

The results obtained are set forth in the following Table 1:

TABLE 1

| Composition | Soil Removal (%) |
| --- | --- |
| 100 wt. % IBIB | 89.3 |
| 90 wt. % IBIB | 79.4 |
| 50 wt. % IBIB | −0.8 |
| Comparative | 95.3 (after 5 cycles) |

The above results show that IBIB, although not quite as potent as the comparative composition, nonetheless removes dried latex paint with considerable efficacy. The above results also show that this efficacy varies in direct proportion to the IBIB concentration in the cleaning composition.

Example 2

A solvent composition according to the present invention was prepared having the following formulation:

33.3% by weight normal decane
33.3% by weight normal undecane
33.3% by weight isobutyl isobutyrate The solvent composition was prepared by adding the normal decane, normal undecane, and isobutyl isobutyrate together and mixing. The solvent composition is 100% volatile, and has an MIR value of 0.88.

The solvent composition was further tested according to the Federal Hazardous Substance Act 16 CFR 1500.3(c)(2)(i), 1500.41, and 1500.42 for toxicity and skin and eye irritation.

It was found that the apparent Acute Oral $LD_{50}$ of the composition was greater than five (5) grams per kilogram body weight, indicating that the solvent composition is not considered to be toxic. The solvent composition is rate as non-toxic. In addition, it was further found that the composition is not a Primary Dermal Irritant and passes the skin irritation test. Furthermore, the composition is not a Primary Eye Irritant and passes the eye irritation test, as well.

The solvent composition was compared to a second comparative composition for removing partially dried enamel paint from wood plank flooring under laboratory conditions by an independent test agency. The second comparative composition was composed of 45% by weight normal decane, 45% by weight normal undecane, 5% by weight d-limonene, and 5% by weight cold pressed orange oil. Gray Enamel (Rustoleum Pewter Gray 7783-P45231) was sprayed onto a 9 cm by 7.5 cm section of plank flooring (Hartco Home Choice #422123-Saddle). The painted board was partially dried at 120° F. for 40 minutes. One ml of the solvent composition in this Example 2 was applied to a section of the paint coating and 1 ml of the second comparative composition was applied to another section of the paint coating. The solvent compositions were covered with a bottle cap to retard evaporation. After 30 seconds the caps were removed and spots were wiped once with a clean towel. This procedure was repeated with soaking intervals of 1, 2, 3, and 4 minutes. The sections treated with the solvent composition in this Example 2 showed puckering and removal of the paint in proportion to the soak time. The sections treated with the second comparative composition showed little change at these time intervals.

TOXICITY TESTING

A cleaning composition composed of pure IBIB was tested for toxicity, skin irritation and eye irritation according to the protocol of the Federal Hazardous Substances Act, 16 CFR 1500.3(c)(2)(i), 1500.41 and 1500.42. The following results were obtained:

| | |
|---|---|
| Acute Oral Toxicity | |
| Dose Level: | 5,000 mg/kg |
| Results: | Acute Oral $LD_{50}$ greater than five (5) grams per gram body weight |
| Conclusion: | Not considered as toxic |
| Skin Irritation | |
| Primary Dermal Irritation Score (Average): | 2.4 |
| Conclusion: | Not a Primary Skin Irritant |
| Eye Irritation | |
| Maximum Mean Total Score (Average): | 3.3 |
| Conclusion: | Not a Primary Irritant |

The above testing shows that IBIB is essentially benign in terms of toxicity, eye irritation and skin irritation.

Although only a few embodiments of the present invention have been described above, it should be appreciated that many modifications can be made without departing from the spirit and scope of the present invention. All such modifications are intended to be included within the scope of the present invention, which is to be limited only by the following claims.

I claim:

1. A process for removing an organic contaminant from a surface comprising contacting the contaminant with a cleaning composition which is essentially free of alkali metal hydroxides, which is not classified as an eye irritant under 16 CFR 1500.42 and which consists essentially of at least 50 wt. % of at least one cleaning member selected from the group consisting of
    (a) organic esters having 6 to 10 carbon atoms other than isobutyl isobutyrate,
    (b) mixtures containing at least three esters selected from hexyl, heptyl, octyl, nonyl, and decyl acetates,
    (c) propylene carbonate, and
    (d) naturally-occurring esters having flash points of greater than 60° F. and boiling points greater than 120° F.,
and thereafter causing the contaminant to be removed from the surface by at least one of
    (i) the flow of the cleaning composition itself,
    (ii) the evaporation of the cleaning composition itself,
    (iii) wiping the surface, and
    (iv) washing the surface with a composition consisting of a liquid.

2. The process of claim 1, wherein a contaminant selected from the group consisting of dried latex paint, uncured organic solvent based paint, adhesives, ink, chewing gum, tars, greases, glues, animal fats, vegetable oils, tree sap and other lipophilic soil is removed by contact with the cleaning composition.

3. The process of claim 2, wherein the contaminant is dried latex paint.

4. The process of claim 2, wherein the cleaning composition comprises at least 80 wt. % cleaning member.

5. The process of claim 4, wherein the composition contains at least 10 wt. % of a liquid carrier other than the cleaning member.

6. The process of claim 5, wherein the cleaning member is dissolved in an organic solvent exhibiting a Primary Irritation Score of 5.00 or less under 16 CFR 1500.3(c)(4).

7. The process of claim 6, wherein the liquid carrier has an MIR of 2.0 or less.

8. The process of claim 6, wherein the composition has a flash point of at least about 100° F.

9. The process of claim 8, wherein the composition exhibits a Primary Irritation Score of 5.00 or less under 16 CFR 1500.3(c)(4).

10. The process of claim 5, wherein the composition has an MIR of 2.0 or less.

11. The process of claim 10, wherein the composition is substantially free of aromatic compounds and alkali metal hydroxides.

12. The process of claim 1, wherein the composition contains water.

13. The process of claim 2, wherein the cleaning member is an organic ester having 6 to 10 carbon atoms other than isobutyl isobutyrate.

14. The process of claim 1, wherein a contaminant selected from the group consisting of dried latex paint, uncured organic solvent based paint, adhesives, ink, chewing gum, tars, greases, glues, animal fats, vegetable oils, tree sap and other lipophilic soil is removed by contact with a cleaning composition containing at least 10 wt. % of a cleaning member selected from organic esters having 6 to 10 carbon atoms other than isobutyl isobutyrate, the cleaning composition having a flash point of at least about 100° F., exhibiting a Primary Irritation Score of 5.00 or less under 16 CFR 1500.3(c)(4), and having an MIR of 2.0 less.

15. The process of claim 14, wherein the cleaning composition contains at least 50 wt. % of the organic ester.

16. The process of claim 15, wherein the cleaning composition contains at least 80 wt. % of the organic ester.

17. The process of claim 16, wherein the cleaning composition contains at least 90 wt. % of the organic ester.

18. The process of claim 1, wherein the contaminant is removed from the surface by washing the surface with soapy water or an organic solvent.

19. The process of claim 1, wherein the cleaning composition consists of at least 80 wt. % of the cleaning member and at least one additional ingredient selected from the group consisting of colorants, antioxidants, fragrances emollients, thickeners, defoamers, surfactants and liquid carriers.

20. The process of claim 19, wherein the cleaning composition has a flash point of at least about 100° F., exhibits a Primary Irritation Score of 5.00 or less under 16 CFR 1500.3(c)(4), and has an MIR of 2.0 or less.

21. A process for removing an organic contaminant from a surface, the organic contaminant comprising dried latex paint, uncured organic solvent based paint, adhesives, ink, chewing gum, tars, greases, glues, animal fats, vegetable oils, tree sap or other lipophilic soil, the process comprising contacting the contaminant with a cleaning composition which is essentially free of alkali metal hydroxides, has a flash point of at least about 100° F., which exhibits a Primary Irritation Score of 5.00 or less under 16 CFR 1500.3(c)(4), which has an MIR of 2.0 or less and which is not classified as an eye irritant under 16 CFR 1500.42, the composition consisting essentially of at least 80 wt. % of at least one cleaning member selected from the group consisting of (a) organic esters having 6 to 10 carbon atoms other than isobutyl isobutyrate, (b) mixtures containing at least three esters selected from hexyl, heptyl, octyl, nonyl, and decyl acetates, (c) propylene carbonate, and (d) naturally-occurring esters having flash points of greater than 60° F. and boiling points greater than 120° F., and thereafter causing the contaminant to be removed from the surface by at least one of (i) the flow of the cleaning composition itself, (ii) the evaporation of the cleaning composition itself, (iii) wiping the surface, and (iv) washing the surface with a composition consisting of a liquid.

22. The process of claim 21, wherein the contaminant is dried latex paint.

23. The process of claim 21, wherein the cleaning composition optionally contains a liquid carrier, the liquid carrier having an MIR of 2.0 or less.

24. The process of claim 23, wherein the liquid carrier is non-toxic according to 16 CFR 1500.3(c)(2)(i), exhibits a Primary Irritation Score of 5.00 or less under, and is not an eye irritant under 16 CFR 1500.42.

25. A process for removing dried latex paint from a surface, the process comprising contacting the dried latex paint with a cleaning composition which is essentially free of alkali metal hydroxides, has a flash point of at least about 100° F., which exhibits a Primary Irritation Score of 5.00 or less under 16 CFR 1500.3(c)(4), which has an MIR of 2.0 or less and which is not classified as an eye irritant under 16 CFR 1500.42, the composition consisting essentially of at least 50 wt. % of at least one cleaning member selected from the group consisting of organic esters having 7 to 9 carbon atoms other than isobutyl isobutyrate, and thereafter causing the contaminant to be removed from the surface by at least one of (i) the flow of the cleaning composition itself, (ii) the evaporation of the cleaning composition itself, (iii) wiping the surface, and (iv) washing the surface with a composition consisting of a liquid.

26. The process of claim 25, wherein the organic ester has 7 carbon atoms.

27. The process of claim 25, wherein the organic ester has 8 carbon atoms.

28. The process of claim 25, wherein the organic ester has 9 carbon atoms.

29. The process of claim 25, wherein the composition consists essentially of at least 80 wt. % of the cleaning member.

30. The process of claim 29, wherein the organic ester has 7 carbon atoms.

31. The process of claim 29, wherein the organic ester has 8 carbon atoms.

32. The process of claim 29, wherein the organic ester has 9 carbon atoms.

33. The process of claim 29, wherein the ester is a heptanoate.

34. The process of claim 29, wherein the ester is a propionate.

35. A process for removing dried latex paint from a surface, the process comprising contacting the dried latex paint with a cleaning composition which is essentially free of alkali metal hydroxides, has a flash point of at least about 100° F., which exhibits a Primary Irritation Score of 5.00 or less under 16 CFR 1500.3(c)(4), which has an MIR of 2.0 or less and which is not classified as an eye irritant under 16 CFR 1500.42, the composition consisting essentially of at least 50 wt. % of at least one cleaning member selected from the group consisting of organic esters having 7 to 9 carbon atoms other than isobutyl isobutyrate.

* * * * *